US012608290B2

(12) United States Patent
Maikhuri et al.

(10) Patent No.: US 12,608,290 B2
(45) Date of Patent: Apr. 21, 2026

(54) DETERMINING HARDWARE ISSUES AND RECOMMENDING CORRESPONDING ACTIONS USING ARTIFICIAL INTELLIGENCE TECHNIQUES

(71) Applicant: Dell Products L.P., Round Rock, TX (US)

(72) Inventors: Ajay Maikhuri, Bangalore (IN); Dhilip Kumar, Bangalore (IN); Bhanu Murthy Modali, Hyderabad TS (IN)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 18/647,531

(22) Filed: Apr. 26, 2024

(65) Prior Publication Data

US 2025/0335320 A1 Oct. 30, 2025

(51) Int. Cl.
*G06F 11/00* (2006.01)
*G06F 11/22* (2006.01)
*G06N 3/0455* (2023.01)

(52) U.S. Cl.
CPC ....... *G06F 11/2263* (2013.01); *G06N 3/0455* (2023.01)

(58) Field of Classification Search
CPC ..................... G06F 11/2263; G06F 11/02263
USPC ...................................... 714/1–57
See application file for complete search history.

(56) References Cited

U.S. PATENT DOCUMENTS 10,963,731 B1 * 3/2021 Sarkar ................. G06F 11/3688
11,526,167 B1 * 12/2022 Konrardy ............... B60R 21/34

| 2018/0370029 | A1 * | 12/2018 | Hall | .................... G06F 11/0715 |
|---|---|---|---|---|
| 2019/0095301 | A1 * | 3/2019 | Sim | ...................... G06F 11/2263 |
| 2020/0327005 | A1 * | 10/2020 | Singh | ................... G06N 3/0464 |
| 2021/0049452 | A1 * | 2/2021 | Fan | ...................... G06N 3/0455 |
| 2021/0368095 | A1 * | 11/2021 | Han | .......................... G06N 3/08 |
| 2021/0405925 | A1 * | 12/2021 | Joshi | .................... G06F 3/0674 |
| 2022/0147411 | A1 * | 5/2022 | Singh | ................. G06F 11/0709 |
| 2022/0215266 | A1 * | 7/2022 | Venkataraman | ....... G06N 3/045 |
| 2022/0222487 | A1 * | 7/2022 | Doggett | ................ G06V 10/82 |

(Continued)

FOREIGN PATENT DOCUMENTS

| CN | 107392218 B | 11/2017 |
|---|---|---|
| TW | I684922 B | 10/2018 |

*Primary Examiner* — Sarai E Butler

(74) *Attorney, Agent, or Firm* — Ryan, Mason & Lewis, LLP

(57) ABSTRACT

Methods, apparatus, and processor-readable storage media for determining hardware issues and recommending corresponding actions using artificial intelligence techniques are provided herein. An example computer-implemented method includes obtaining input image data pertaining to at least one hardware item; identifying one or more portions of the at least one hardware item by processing at least a portion of the input image data using a first set of one or more artificial intelligence techniques; detecting, in the one or more identified portions, at least one defect of the at least one hardware item by processing the at least a portion of the input image data using a second set of one or more artificial intelligence techniques; generating at least one recommendation, associated with the at least one hardware item, in connection with the at least one detected defect; and performing one or more automated actions based on the at least one recommendation.

20 Claims, 8 Drawing Sheets

(56) References Cited

U.S. PATENT DOCUMENTS

| | | | | |
|---|---|---|---|---|
| 2022/0327389 A1* | 10/2022 | AlRegib | ................ | G06N 3/045 |
| 2023/0186225 A1* | 6/2023 | Vepa | .................... | G06F 40/295 |
| | | | | 705/7.42 |
| 2023/0385964 A1* | 11/2023 | Al-Sharieh | ............ | G06Q 50/16 |
| 2024/0007725 A1* | 1/2024 | Nakano | .................... | G06T 7/90 |
| 2024/0020835 A1* | 1/2024 | Cherubini | ................ | G06T 7/73 |
| 2024/0070834 A1* | 2/2024 | Amouie | ............... | G06F 18/214 |

\* cited by examiner

Figure 2:
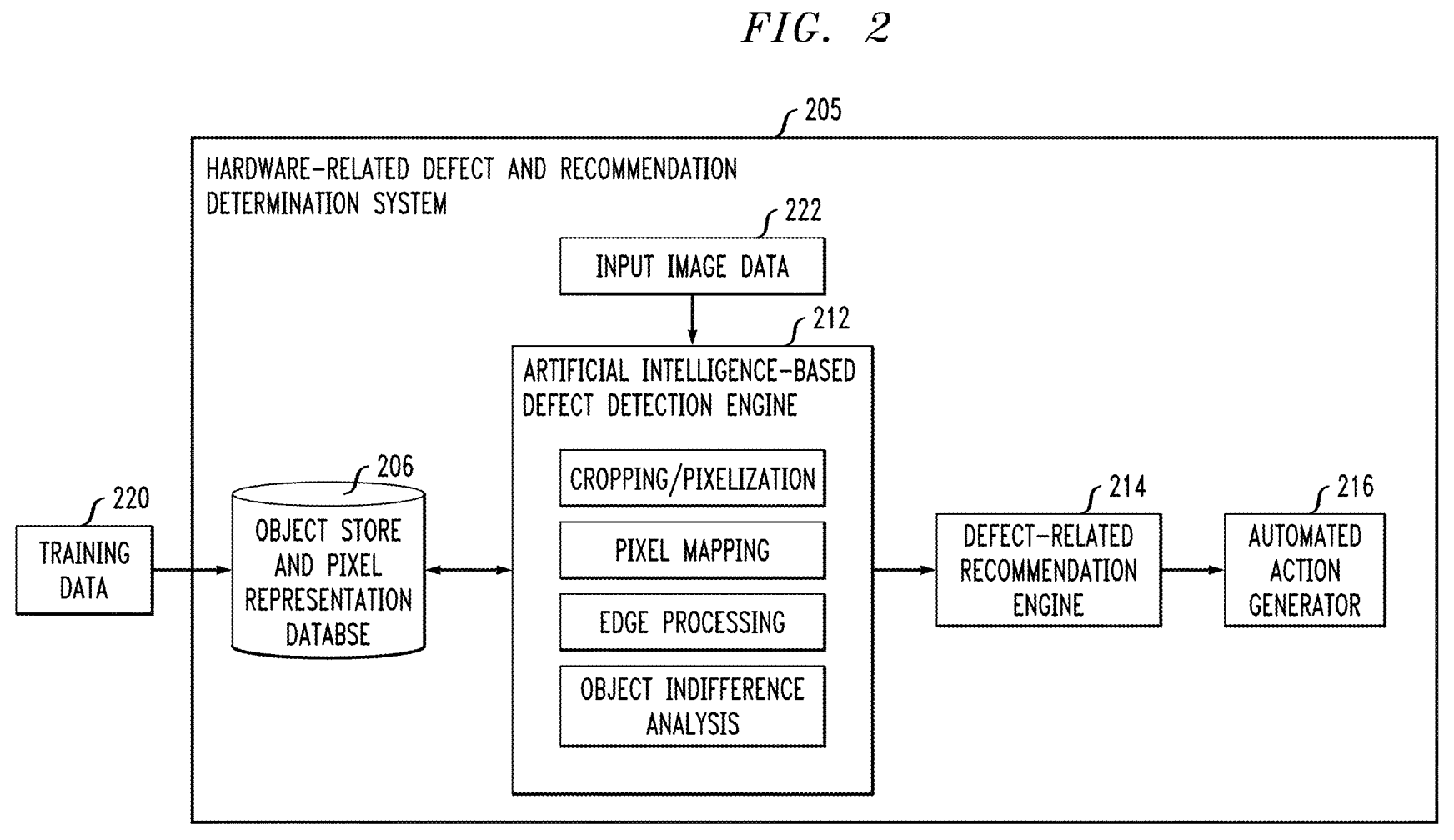

HARDWARE-RELATED DEFECT AND RECOMMENDATION DETERMINATION SYSTEM — 205

TRAINING DATA — 220

OBJECT STORE AND PIXEL REPRESENTATION DATABSE — 206

INPUT IMAGE DATA — 222

ARTIFICIAL INTELLIGENCE-BASED DEFECT DETECTION ENGINE — 212

CROPPING/PIXELIZATION

PIXEL MAPPING

EDGE PROCESSING

OBJECT INDIFFERENCE ANALYSIS

DEFECT-RELATED RECOMMENDATION ENGINE — 214

AUTOMATED ACTION GENERATOR — 216

```
knn = kNeighborClassifier(n_neighbors=9,algorithm='ball_tree',n_jobs=-1)
knn.fit(np.array(data),np.array(labels))

if isurl:
        img = io.imread(label)
        img = cv2.resize(img,(224,224))
else:
        img_path = '/content/dataset/'+label
        img = image.load_img(img_path, target_size(224,224))

img_data = image.img_to_array(img)
        img_data = np.expand_dims(img_data,axis=0)
        img_data = preprocess_input(img_data)
        feature = model.predict(img_data)
        feature = np.array(feature).flatten().reshape(1,-1)
        res = knn.kneighbors(feature.reshape(1,-1),return_distance=True,n_neighbors=N)
        results_(img,list(res[1][0])[1:])
```

FIG. 5

$\int$ 500

```
# import required libraries
import numpy as np
import cv2
import matplotlib.pyplot as plt read two input images as grayscale
damagedimage = cv2.imread(r"ScreenDamange.png", 0)|
Originalimage = cv2.imread(r"LaptionOriginal.png", 0)

# Apply ratio test
# create BFMatcher object
bf = cv2.BFMatcher()
matches = bf.knnMatch(des1,des2, k=2)

good = []

for m,n in matches;
    if m.distance < 0.1*n.distance:
        good.append([m])

#cv2.drawMatchesKnn expects a list of lists as matches.
img3 = cv2.drawMatchesKnn(img1,kp1,img2,kp2,good,None,flags=0)
plt.imshow(img3),plt.show()
```

*FIG. 8*

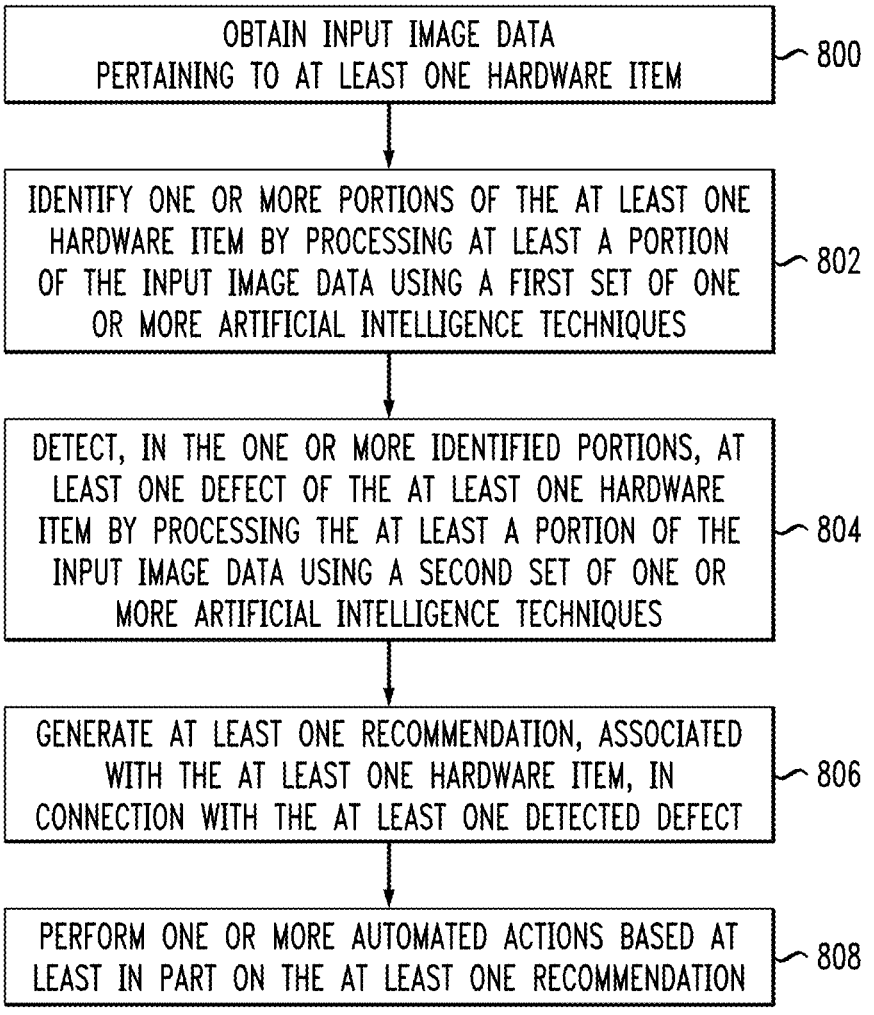

OBTAIN INPUT IMAGE DATA
PERTAINING TO AT LEAST ONE HARDWARE ITEM        800

IDENTIFY ONE OR MORE PORTIONS OF THE AT LEAST ONE
HARDWARE ITEM BY PROCESSING AT LEAST A PORTION
OF THE INPUT IMAGE DATA USING A FIRST SET OF ONE
OR MORE ARTIFICIAL INTELLIGENCE TECHNIQUES        802

DETECT, IN THE ONE OR MORE IDENTIFIED PORTIONS, AT
LEAST ONE DEFECT OF THE AT LEAST ONE HARDWARE
ITEM BY PROCESSING THE AT LEAST A PORTION OF THE
INPUT IMAGE DATA USING A SECOND SET OF ONE OR
MORE ARTIFICIAL INTELLIGENCE TECHNIQUES        804

GENERATE AT LEAST ONE RECOMMENDATION, ASSOCIATED
WITH THE AT LEAST ONE HARDWARE ITEM, IN
CONNECTION WITH THE AT LEAST ONE DETECTED DEFECT        806

PERFORM ONE OR MORE AUTOMATED ACTIONS BASED AT
LEAST IN PART ON THE AT LEAST ONE RECOMMENDATION        808

900

910-1

APPS 910-2

APPS

910-L

APPS 902-1

VM AND/OR
CONTAINER
SET 1

VM AND/OR
CONTAINER
SET 2

902-2
. . .

VM AND/OR
CONTAINER
SET L

902-L

VIRTUALIZATION  INFRASTRUCTURE

904

PHYSICAL  INFRASTRUCTURE

905

1000

1002-1
PROCESSING  DEVICE

1014
NETWORK
INTERFACE

1010
PROCESSOR

1012
MEMORY

1004

NETWORK 1002-2
PROCESSING
DEVICE 1002-3
PROCESSING
DEVICE

1002-K
PROCESSING
DEVICE

DETERMINING HARDWARE ISSUES AND RECOMMENDING CORRESPONDING ACTIONS USING ARTIFICIAL INTELLIGENCE TECHNIQUES

COPYRIGHT NOTICE

BACKGROUND

When users encounter issues with defective and/or faulty hardware items, the users often seek assistance from one or more support entities. Conventional hardware management approaches commonly use specialized human support teams which employ hardware analysis, frequently in connection with on-site visits. However, such conventional approaches are resource-intensive and error-prone, which can lead to additional hardware returns and/or unnecessary hardware wastage.

SUMMARY

Illustrative embodiments of the disclosure provide techniques for determining hardware issues and recommending corresponding actions using artificial intelligence techniques.

An exemplary computer-implemented method includes obtaining input image data pertaining to at least one hardware item, and identifying one or more portions of the at least one hardware item by processing at least a portion of the input image data using a first set of one or more artificial intelligence techniques. The method also includes detecting, in the one or more identified portions, at least one defect of the at least one hardware item by processing the at least a portion of the input image data using a second set of one or more artificial intelligence techniques. Additionally, the method further includes generating at least one recommendation, associated with the at least one hardware item, in connection with the at least one detected defect, and performing one or more automated actions based at least in part on the at least one recommendation.

Illustrative embodiments can provide significant advantages relative to conventional hardware management approaches. For example, problems associated with resource-intensive and error-prone conventional approaches are overcome in one or more embodiments through automatically identifying hardware defects and generating recommendations corresponding thereto using a combination of artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 1 shows an information processing system configured for determining hardware issues and recommending corresponding actions using artificial intelligence techniques in an illustrative embodiment.

FIG. 2 shows example system architecture in an illustrative embodiment.

FIG. 4 shows example pseudocode for predicting image features in an illustrative embodiment.

FIG. 5 shows example pseudocode for image data feature mapping in an illustrative embodiment.

FIG. 8 is a flow diagram of a process for determining hardware issues and recommending corresponding actions using artificial intelligence techniques in an illustrative embodiment.

DETAILED DESCRIPTION

Figure 3:
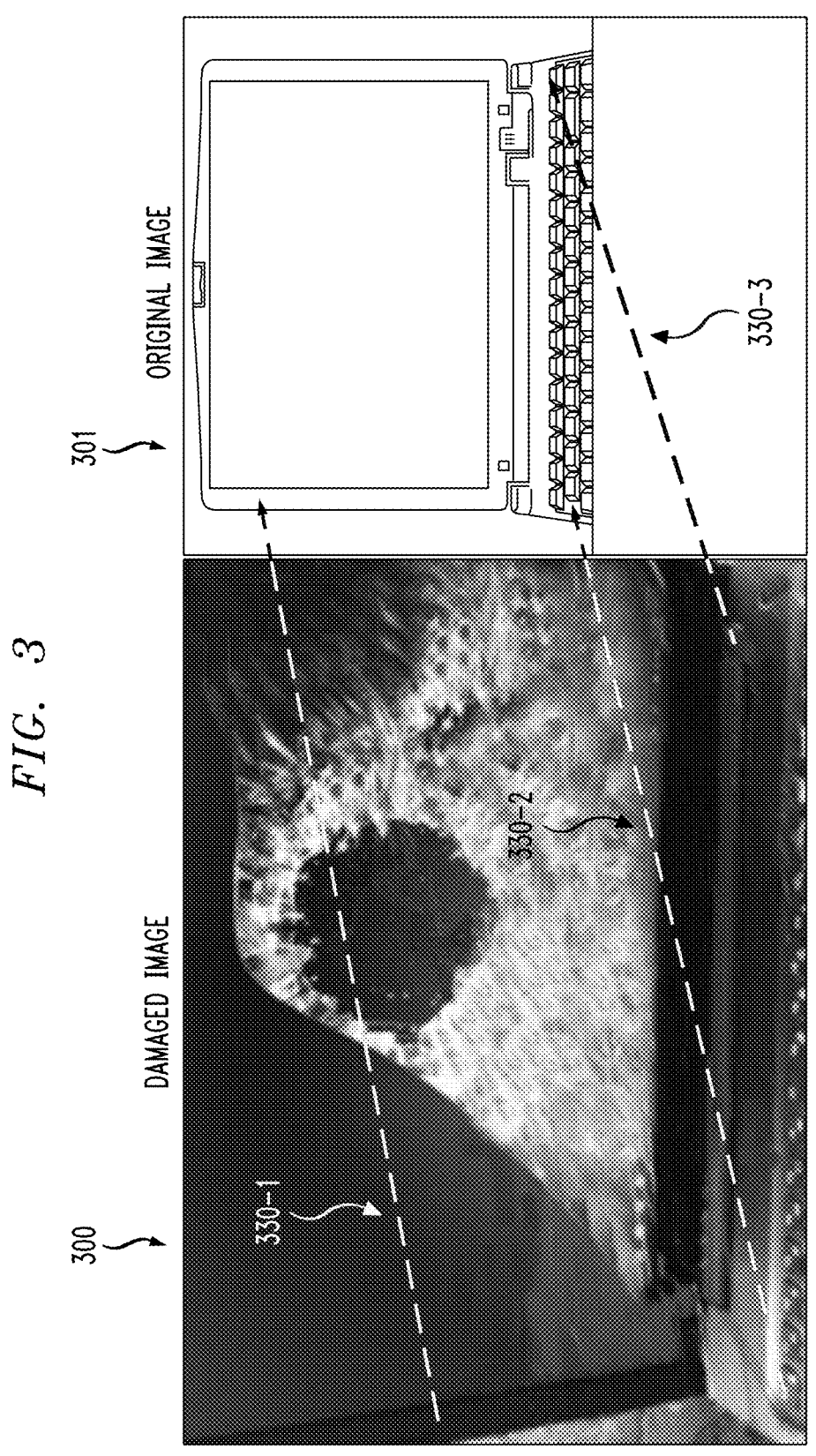
FIG. 3 shows example image feature mapping in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
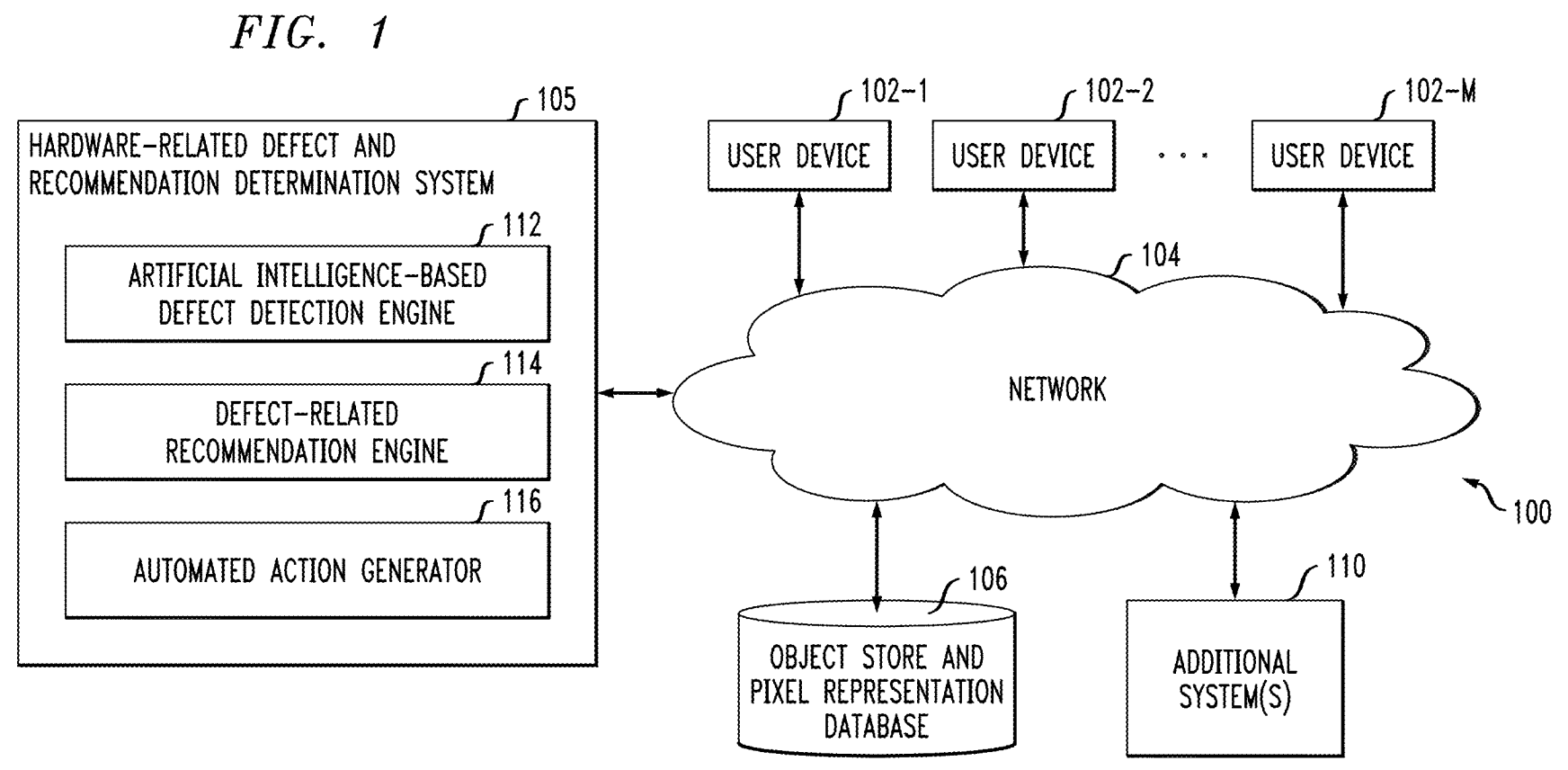

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is hardware-related defect and recommendation determination system 105 and one or more additional systems 110 (e.g., hardware repair systems, hardware refurbishment systems, hardware recycling systems, hardware disposal systems, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the hardware-related defect and recommendation determination system 105 can have an associated object store and pixel representation database 106 configured to store data pertaining to original hardware items and/or hardware items devoid of defects, wherein such data can include image data, component data, orientation data, descriptive and/or text data, etc.

The object store and pixel representation database 106 in the present embodiment is implemented using one or more storage systems associated with the hardware-related defect and recommendation determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the hardware-related defect and recommendation determination system 105 are one or more input-output devices, which illustratively comprise keyboards, displays or other types of input-output devices in any combination. Such input-output devices can be used, for example, to support one or more user interfaces to the hardware-related defect and recommendation determination system 105, as well as to support communication between the hardware-related defect and recommendation determination system 105 and other related systems and devices not explicitly shown.

Additionally, the hardware-related defect and recommendation determination system 105 in the FIG. 1 embodiment is assumed to be implemented using at least one processing device. Each such processing device generally comprises at least one processor and an associated memory, and implements one or more functional modules for controlling certain features of the hardware-related defect and recommendation determination system 105.

More particularly, the hardware-related defect and recommendation determination system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the hardware-related defect and recommendation determination system 105 to communicate over the network 104 with the user devices 102, and illustratively comprises one or more conventional transceivers.

The hardware-related defect and recommendation determination system 105 further comprises artificial intelligence-based defect detection engine 112, defect-related recommendation engine 114, and automated action generator 116.

It is to be appreciated that this particular arrangement of elements 112, 114 and 116 illustrated in the hardware-related defect and recommendation determination system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for determining hardware issues and recommending corresponding actions using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of hardware-related defect and recommendation determination system 105, object store and pixel representation database 106, and additional system(s) 110 can be on and/or part of the same processing platform.

An exemplary process utilizing elements 112, 114 and 116 of an example hardware-related defect and recommendation determination system 105 in computer network 100 will be described in more detail with reference to the flow diagram of FIG. 8.

Accordingly, at least one embodiment includes determining hardware issues and recommending corresponding actions using artificial intelligence techniques. Such an embodiment includes integrating one or more artificial intelligence techniques and one or more computer vision techniques to inspect and/or evaluate hardware items (e.g., returned electronic devices and/or components thereof), and detect physical defects, damages, and/or irregularities in the hardware items, facilitating identification of issues (e.g., scratches, rivets, assembly flaws, etc.) and initiating of repairs and/or other remedial actions (e.g., recycling, refurbishment, remanufacturing, repackaging, etc.). By way of example, at least one embodiment includes leveraging convolutional autoencoder model architecture to obtain compressed image data. In such an embodiment, one or more initial convolutional layers of the encoder model determine and/or implement feature extraction from any layer of the model. Also, after obtaining compressed data representation of the relevant images, such an embodiment can include applying at least one k-means clustering algorithm to group the images into different clusters. After clustering the data, the clustered data can be labeled, and at least one k-nearest neighbors algorithm can be applied thereto to determine and/or find similar images (nearest neighbors).

One or more embodiments can include using camera images to detect one or more patterns of state of a given hardware item (e.g., a returned device) by comparing the camera images to original hardware item image data. Such a comparison can be carried out, for example, on a pixel-by-pixel basis to identify the portion(s) of the hardware item containing a defect and/or damage. Within the identified portion(s) of the hardware item, one or more embodiments can also include applying at least one probability distribution to identify the specific type of damage and/or issue and generate at least one recommend type of action that can be taken in connection with the identified damage and/or issue.

As further detailed herein, at least one embodiment includes constructing and/or training at least one model using original hardware item image data. Additionally, such an embodiment can include mapping portions of image data pertaining to at least one hardware defect to one or more portions of the original hardware item image data (e.g., a pixel-by-pixel comparison) to identify one or more issue and/or damage areas in the given hardware item.

FIG. 2 shows example system architecture in an illustrative embodiment. By way of illustration, FIG. 2 depicts training data 220 being provided to and/or stored by object store and pixel representation database 206 within hardware-related defect and recommendation determination system 205. Such training data 220 can include data pertaining to each of multiple facets and/or components of one or more hardware items, identified and/or categorized by model. As also illustrated in FIG. 2, at least a portion of the data stored by object store and pixel representation database 206 can be used to train at least a portion of artificial intelligence-based defect detection engine 212. Additionally, once trained, artificial intelligence-based defect detection engine 212 can process input image data 222 (which can include, e.g., image data pertaining to at least one hardware item suspected of having one or more defects and/or experiencing one or more issues) to identify one or more portions of the corresponding hardware item(s) and detect one or more defects within such identified portions of the hardware item(s).

More particularly, one or more embodiments include identifying, using artificial intelligence-based defect detection engine 212, one or more portions of an original version of a given hardware item (e.g., a new, un-damaged version of the hardware item) which correspond to the input image data 222 (e.g., image data sent by a user of the given hardware item experiencing one or more issues) by cropping and/or pixelating at least a portion of the input image data 222, and implementing one or more pixel mapping techniques on the resulting portion(s) of the image data. Further, such an embodiment also includes detecting one or more anomalies in the image data in question by performing object indifference analysis, which can include comparing at least a portion of the image data to image data associated with the one or more portions of an original version of the given hardware item.

As also illustrated in FIG. 2, data pertaining to the one or more detected anomalies can be provided to and/or processed by defect-related recommendation engine 214, which generates at least one recommendation for carrying out one or more actions in connection with at least a portion of the one or more detected anomalies. The at least one recommendation can then be used and/or leveraged by automated action generator 216 to initiate and/or perform at least one action in accordance with the at least one recommendation, wherein such an action can pertain, for example, to repairing at least a portion of the hardware item, recycling at least a portion of the hardware item, refurbishing at least a portion of the hardware item, and disposing of at least a portion of the hardware item.

By way merely of example, at least one embodiment can obtain and process image data pertaining to a laptop, categorizing each of multiple parts of the laptop from one or more views and/or orientations. Such image data, annotated with the noted categorizations, can be saved and/or stored in one or more databases for future use, as further detailed herein. For example, in one or more embodiments, at least one table can be generated and/or populated which represents a list of the image portions for that given laptop model of reference.

After one or more databases of categorized original hardware item(s) has been generated and/or populated, portions of the data therein can be used by one or more artificial intelligence techniques in analysis against image data provided by at least one user and/or otherwise under evaluation (e.g., image data associated with a damaged and/or defective hardware item) by mapping one or more characteristics of the original image data onto the determined analogous section of the provided image data.

FIG. 3 shows example image feature mapping in an illustrative embodiment. By way of illustration, FIG. 3 depicts characteristic and/or feature mapping of original hardware image data 301 and damaged hardware image data 300, and filtering such mappings if a given threshold value (e.g., a similarity threshold) associated therewith is met and/or surpassed. For example, if 90% of features of given portion(s) of the damaged hardware image data are mapped to one or more corresponding portions of the original hardware image data using mapping lines 330-1, 330-2 and 330-3, then the corresponding location(s) and/or part(s) of the damaged image data is/are identified and categorized.

Such an embodiment can include using at least one convolutional autoencoder model architecture to obtain and/or process compressed image data in connection with the identification and/or categorization steps. For example, one or more layers of such a convolutional autoencoder model can perform feature extraction. Additionally, after obtaining and/or generating a compressed data representation of one or more images, at least one embodiment includes processing at least a portion of such compressed data using at least one k-means clustering algorithm to group the image data into different clusters. The at least one k-means clustering algorithm encompasses at least one unsupervised machine learning algorithm that partitions a dataset into k clusters by iteratively assigning data points to the nearest cluster centroid and updating centroids based at least in part on the mean of the assigned data points, aiming to minimize within-cluster variance. After clustering the image data, such an embodiment can include labeling at least portions of the image data in accordance with the corresponding clusters.

Additionally, using the labeled data, one or more embodiments can include processing image data using at least one k-nearest neighbors (K-NN) algorithm to find and/or identify similar images and/or portions thereof.

FIG. 4 shows example pseudocode for predicting image features in an illustrative embodiment. In this embodiment, example pseudocode 400 is executed by or under the control of at least one processing system and/or device. For example, the example pseudocode 400 may be viewed as comprising a portion of a software implementation of at least part of hardware-related defect and recommendation determination system 105 of the FIG. 1 embodiment.

The example pseudocode 400 illustrates generating one or more image feature predictions for input image data and returning N similar images from at least one dataset. One or more embodiments can include passing and/or processing the file name or the uniform resource locator (URL) for the image data in question using at least one k-nearest neighbors algorithm in connection with one or more computer vision techniques to identify one or more similarities of the image data in question to one or more training image datasets though feature identification. Accordingly, example pseudocode 400 (which, e.g., can use Jupyter Notebook) provides steps for leveraging compute vision techniques associated with image data feature mapping.

It is to be appreciated that this particular example pseudocode shows just one example implementation of predicting image features, and alternative implementations can be used in other embodiments.

FIG. 5 shows example pseudocode for image data feature mapping in an illustrative embodiment. In this embodiment, example pseudocode 500 is executed by or under the control of at least one processing system and/or device. For example, the example pseudocode 500 may be viewed as comprising a portion of a software implementation of at least part of hardware-related defect and recommendation determination system 105 of the FIG. 1 embodiment.

The example pseudocode 500 illustrates feature mapping predictions generated by at least one model using at least one k-nearest neighbors algorithm. More particularly, example pseudocode 500 illustrates implementing a k-nearest neighbors algorithm to match images by identifying the location and/or component in the given device and/or system. As further detailed herein, once the location and/or component in the given device and/or system is identified, then one or more embodiments can include detecting and/or identifying at least one specific error and/or defect associated therewith.

It is to be appreciated that this particular example pseudocode shows just one example implementation of image data feature mapping, and alternative implementations can be used in other embodiments.

As noted above and detailed herein, one or more embodiments include performing feature mapping across multiple image data samples by identifying the location(s) and/or portion(s) of one or more given hardware items displayed in the provided image data by utilizing nearest neighbor techniques. In addition, identifying the location(s) and/or portion(s) of one or more given hardware items displayed in the provided image data, one or more embodiments include determining at least one type of physical defect displayed in the provided image data.

Such an embodiment can include using at least one unsupervised learning technique to detect and localize one or more irregularities (e.g., physical defects associated with the corresponding hardware item) in image data using two-dimensional normalizing flows. By way of example, at least one embodiment includes using one or more computer vision techniques such as FastFlow, a two-dimensional flow-based probability distribution estimator with normalization. For unsupervised anomaly detection and localization, FastFlow can be used as a plug-in module with one or more deep feature extractors (e.g., such as a residual network (ResNet), one or more vision transformers, etc.). In a training phase, FastFlow can be trained and/or taught to transform an input visual feature into a tractable distribution. Further, in an inference phase, FastFlow evaluates the probability of identifying one or more anomalies in image data.

Figures 6, 7:
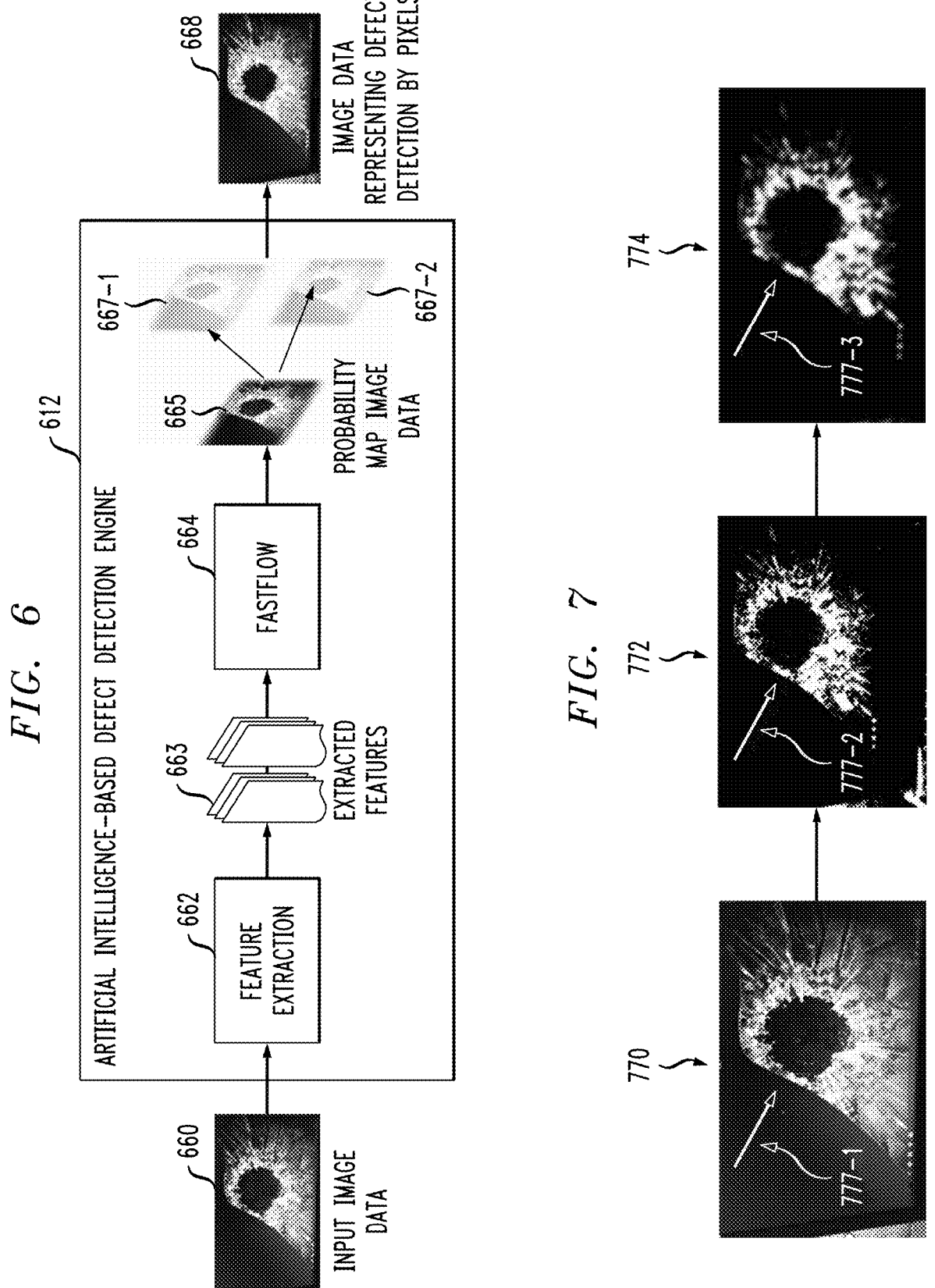
FIG. 6 shows an example workflow carried out by artificial intelligence-based defect detection engine in an illustrative embodiment.
FIG. 7 shows example anomaly detection using a Fast-Flow model in an illustrative embodiment.

FIG. 6 shows an example workflow carried out by artificial intelligence-based defect detection engine in an illustrative embodiment. By way of illustration, FIG. 6 depicts input image data 660 provided to and/or processed by artificial intelligence-based defect detection engine 612 to a version of input image data representing defect detection by pixels 668. More specifically, artificial intelligence-based defect detection engine 612 performs feature extraction 662 (e.g., using ResNet) on one or more (anomalous) portions of input image data 660, and uses at least a portion of the extracted features 663 to generate a two-dimensional flow-based probability distribution. Additionally, as depicted in FIG. 6, FastFlow techniques 664 can be implemented to transform the extracted features 663 to probability map image data 665, which can then be standardized, as represented by elements 667-1 and 667-2, by removing noise and/or one or more other elements from the image data as well as naming and/or identifying the given anomaly.

One or more embodiments can include using unsupervised learning techniques in identifying irregularities and localization thereof. Also, in at least one embodiment, extant representation-based methods can derive normal image features using at least one deep convolutional neural network, and can characterize the corresponding distribution using one or more nonparametric distribution estimation techniques. In such an embodiment, an anomaly score can be computed by quantifying the distance between an image feature and its estimated distribution.

In such an embodiment, using unsupervised learning for anomaly detection includes utilizing one or more unsupervised learning techniques to identify one or more irregularities and/or anomalies in a dataset, wherein the unsupervised learning encompasses at least one algorithm which learns one or more patterns and/or structures from unlabeled data without explicit supervision. Additionally, using extant representation-based methods can include extracting one or more meaningful features from the data using, e.g., deep convolutional neural networks in connection with image data. Also, at least one embodiment can include using one or more deep convolutional neural networks to derive normal image features from the dataset, wherein such neural networks learn to extract features that represent typical and/or normal patterns in the images. Once the typical and/or normal image features are extracted, the corresponding distribution of these features is characterized using one or more nonparametric distribution estimation techniques. Such nonparametric distribution estimation techniques do not include assumptions about the underlying distribution of the data, allowing for more flexibility in capturing its characteristics. Further, in such an embodiment, an anomaly score can then be computed for each image by quantifying the distance between its features and the estimated distribution. This score represents how much the features of an image deviate from what is considered typical and/or normal based on the learned distribution. Images with higher anomaly scores are likely to contain irregularities and/or anomalies.

As detailed herein, in at least one embodiment, FastFlow transforms input image characteristics from an original distribution to a normal distribution. As detailed herein, the features of the normal area in the input image fall approximately in the center of the distribution, while abnormal features are farther away from the center of the distribution. For example, one or more features of the normal region in the input image can be positioned in the center of the distribution, while the features of the aberrant region can be positioned far from the center of the distribution, as depicted in the FIG. 6 example.

Using ResNet and/or one or more vision transformers, at least one embodiment includes extracting a representative feature from input image data. A global relationship required to differentiate anomalous regions from other local parts can be learned and/or determined in connection with one or more embodiments, when utilizing a vision transformer as the feature extractor, using the features of a single layer. When utilizing a vision transformer as the feature extractor, the model typically includes multiple layers, each performing one or more specific operations on the input image. These layers may include, e.g., self-attention mechanisms and feedforward neural networks. In this context, instructions can suggest using only the features extracted from a single layer of the vision transformer model, wherein such a decision is based at least in part on the understanding that vision transformers have a greater capacity to capture the relationship between local regions and global features within a single layer, making it suitable for an anomaly detection task.

Additionally, when utilizing ResNet as the feature extractor, one or more embodiments can include directly using the features of the final layer in the first three blocks, and incorporating these features into three FastFlow model blocks. As used herein, a block refers to a group of layers within the ResNet architecture, which encompasses a deep convolutional neural network architecture that can be used for image classification and/or feature extraction tasks.

As used herein, a FastFlow model is a bidirectional probability distribution transformer with inversion capability. In a forward procedure, the input feature map from the backbone network is transformed into a standard normal distribution in two-dimensional space. In a reverse procedure, the inverse of FastFlow can generate the visual characteristic from a particular probability sampling variable. To illustrate this capability, e.g., in light of a FastFlow model, the forward procedure (e.g., from visual features to probability map) and the reverse procedure (e.g., from probability map to visual features) are represented graphically in FIG. 7.

Accordingly, FIG. 7 shows example anomaly detection using a FastFlow model in an illustrative embodiment. For example, as illustrated in FIG. 7 in connection with images 770, 772, and 774, arrows 777-1, 777-2, and 777-3 indicate the anomalous region extracted from an input image belonging to a given class and/or category within a classification system used for image recognition and/or classification tasks. In one or more embodiments, the anomalous region extracted from an input image can be submitted to and/or processed by a FastFlow model to generate a probability map. Also, the original distribution can be successfully transformed by such a FastFlow model into the standard normal distribution. Then, using the inverse FastFlow model, such an embodiment can include generating a feature tensor from a contamination probability map, in which the feature map of one channel in this feature tensor can be visualized and it can be observed that a new anomaly appeared in the corresponding pollution position. Such techniques, therefore, can be utilized to remove one or more unwanted characteristics of the image(s), which helps to focus on the detected defect(s).

Based at least in part on an irregularity identified in connection with a given hardware portion and/or component identified, one or more embodiments include reporting such identifications using corresponding mapping labeling. Additionally, based at least in part on the size and/or position of the identified irregularity, a reverse fulfillment method can be initiated. In at least one embodiment, the input image size and the input feature size can be set according to the backbone network, and the block index indicates the block from which the feature is obtained. In such an embodiment if the block index identified is greater than zero, then that indicates the presence of an anomaly. If the anomaly is the associated with one or more parts and/or one or more portions of the given hardware item, then at least one embodiment includes determining and outputting at least one recommendation for one or more responsive actions with respect to anomaly.

Accordingly, as detailed herein, one or more embodiments include leveraging artificial intelligence techniques and computer vision techniques to concretize the state of particular hardware items (e.g., returned and/or defective hardware devices), reducing ambiguity and/or human errors, as well as enhancing sustainability and/or hardware reusability. Additionally, such an embodiment can include recommending one or more actions for each identified hardware defect, such as, e.g., repair, refurbishment, recycling, disposal, etc. Also, one or more embodiments include using one or more computer vision techniques such as, e.g., Fastflow for unsupervised anomaly detection, enabling accurate hardware defect identification, which can result in extending the lifespan of such hardware items (e.g., reducing the chances of missed opportunities for repair and refurbishment) and reducing the environmental impact of manufacturing and disposal processes.

Further, at least one embodiment can include utilizing data-driven insights pertaining to hardware quality and/or hardware design flaws. More particularly, such an embodiment can include leveraging feature mapping to accurately and/or precisely identify damaged hardware items and/or components thereof, enabling further learning of one or more common issues with the given hardware items and leveraging such learning to improve and/or optimize hardware-related processes (e.g., manufacturing processes, design processes, etc.). Additionally, such an embodiment can include using log data associated with the given hardware items to facilitate retrieval of hardware-related issues for auditing purposes.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions based on image data and/or related feature extraction and mapping across image data, and such recommendations and/or predictions can be used to initiate one or more automated actions (e.g., automatically initiating one or more repair, recycling and/or refurbishment actions in connection with one or more separate and/or external systems, automatically retraining at least a portion of the model using at least a portion of the recommendation and/or prediction output(s), etc.).

FIG. 8 is a flow diagram of a process for determining hardware issues and recommending corresponding actions using artificial intelligence techniques in an illustrative embodiment. It is to be understood that this particular process is only an example, and additional or alternative processes can be carried out in other embodiments.

In this embodiment, the process includes steps 800 through 808. These steps are assumed to be performed by the hardware-related defect and recommendation determination system 105 utilizing elements 112, 114 and 116.

Step 800 includes obtaining input image data pertaining to at least one hardware item. Step 802 includes identifying one or more portions of the at least one hardware item by processing at least a portion of the input image data using a first set of one or more artificial intelligence techniques. In at least one embodiment, identifying one or more portions of the at least one hardware item by processing at least a portion of the input image data using a first set of one or more artificial intelligence techniques includes processing the at least a portion of the input image data using at least one convolutional autoencoder model (e.g., an example artificial intelligence technique included in the first set of one or more artificial intelligence techniques).

Additionally or alternatively, identifying one or more portions of the at least one hardware item can include comparing the at least a portion of the input image data to reference image data of at least one corresponding hardware item. In such an embodiment, comparing the at least a portion of the input image data to reference image data of a corresponding hardware item can include cropping the at least a portion of the input image data from the obtained input image data, pixelating the cropped portion of the input image data, and implementing one or more pixel mapping techniques on the pixelated portion of the input image data and at least a portion of the reference image data of the at least one corresponding hardware item.

Further, in at least one embodiment, identifying one or more portions of the at least one hardware item includes grouping sections of the at least a portion of the input image data into multiple clusters by processing the at least a portion of the input image data using at least one k-means clustering algorithm (e.g., another example artificial intelligence technique included in the first set of one or more artificial intelligence techniques). In such an embodiment, identifying one or more portions of the at least one hardware item can include processing at least a portion of the multiple clusters, in connection with reference image data of at least one corresponding hardware item, using at least one k-nearest neighbors algorithm (e.g., yet another example artificial intelligence technique included in the first set of one or more artificial intelligence techniques).

Step 804 includes detecting, in the one or more identified portions, at least one defect of the at least one hardware item by processing the at least a portion of the input image data using a second set of one or more artificial intelligence techniques. In one or more embodiments, detecting at least one defect of the at least one hardware item by processing the at least a portion of the input image data using a second set of one or more artificial intelligence techniques includes processing the at least a portion of the input image data using one or more computer vision techniques (e.g., an example artificial intelligence technique included in the second set of one or more artificial intelligence techniques). In such an embodiment, processing the at least a portion of the input image data using one or more computer vision techniques can include processing the at least a portion of the input image data using at least one FastFlow model (e.g., another example artificial intelligence technique included in the second set of one or more artificial intelligence techniques). Additionally or alternatively, detecting at least one defect of the at least one hardware item can include identifying at least one type of defect associated with the at least one detected defect by applying at least one probability distribution to the input image data corresponding to the one or more identified portions of the at least one hardware item.

Step 806 includes generating at least one recommendation, associated with the at least one hardware item, in connection with the at least one detected defect. In at least one embodiment, the at least one recommendation can be generated using at least one rule-based algorithm and/or at least one machine learning-based classification algorithm. Step 808 includes performing one or more automated actions based at least in part on the at least one recommendation. In one or more embodiments, performing one or more automated actions includes automatically initiating, via one or more external systems, at least one of one or more hardware item repair operations, one or more hardware item refurbishment operations, one or more hardware item recycling operations, and one or more hardware item disposal operations. Additionally or alternatively, performing one or more automated actions can include automatically training at least a portion of the first set of one or more artificial intelligence techniques using feedback related to the at least one recommendation and/or automatically training at least a portion of the second set of one or more artificial intelligence techniques using feedback related to the at least one recommendation.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically identify hardware defects and generate recommendations corresponding thereto using a combination of artificial intelligence techniques. These and other embodiments can effectively overcome problems associated with resource-intensive and error-prone conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figures 9, 10:
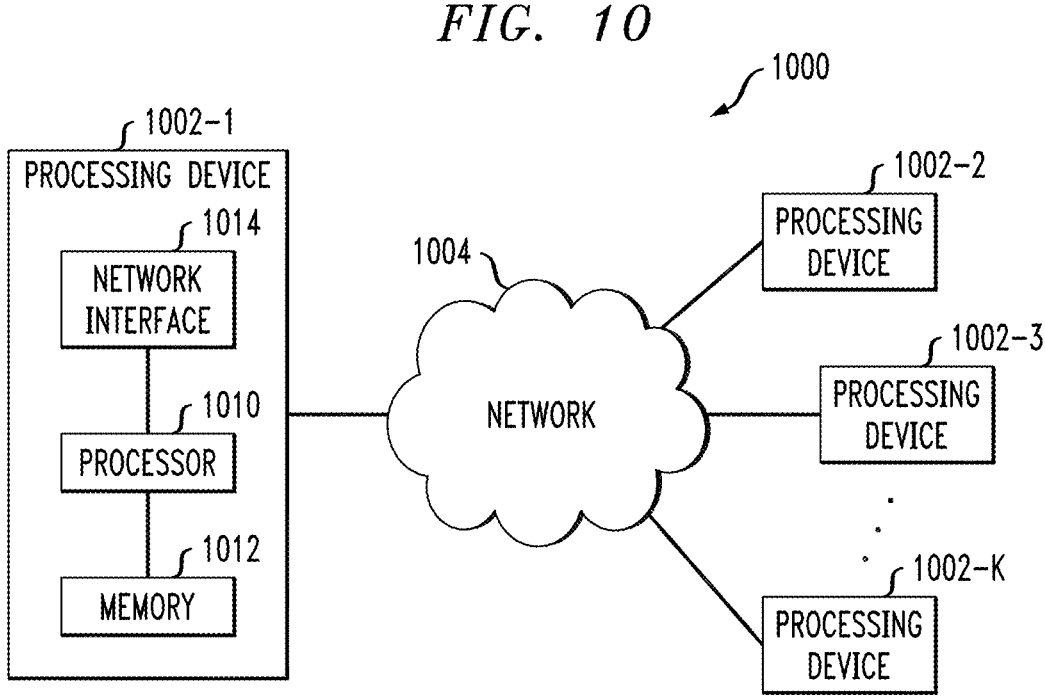
FIGS. 9 and 10 show examples of processing platforms that may be utilized to implement at least a portion of an information processing system in illustrative embodiments.

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining input image data pertaining to at least one hardware item;
identifying one or more portions of the at least one hardware item by processing at least a portion of the input image data using at least one convolutional autoencoder model, wherein processing the at least a portion of the input image data using the at least one convolutional autoencoder model comprises:
generating at least one compressed data representation of the at least a portion of the input image data; and
identifying the one or more portions of the at least one hardware item by processing the at least one compressed data representation of the at least a portion of the input image data using one or more of at least one clustering algorithm and at least one supervised learning algorithm;
detecting, in the one or more identified portions, at least one defect of the at least one hardware item by processing the at least a portion of the input image data using one or more computer vision techniques;
generating at least one recommendation associated with the at least one hardware item, the at least one recommendation pertaining to resolving the at least one detected defect using at least one system external to the at least one hardware item; and
performing, in connection with using the at least one system external to the at least one hardware item, one or more automated actions based at least in part on the at least one recommendation;
wherein the method is performed by at least one processing device comprising a processor coupled to a memory.

2. The computer-implemented method of claim 1, wherein processing the at least a portion of the input image data using one or more computer vision techniques comprises processing the at least a portion of the input image data using at least one FastFlow model.

3. The computer-implemented method of claim 1, wherein performing one or more automated actions comprises automatically initiating, via the at least one system external to the at least one hardware item, at least one of one or more hardware item repair operations, one or more hardware item refurbishment operations, one or more hardware item recycling operations, and one or more hardware item disposal operations.

4. The computer-implemented method of claim 1, wherein identifying one or more portions of the at least one hardware item comprises comparing the at least a portion of the input image data to reference image data of at least one corresponding hardware item.

5. The computer-implemented method of claim 4, wherein comparing the at least a portion of the input image data to reference image data of a corresponding hardware item comprises cropping the at least a portion of the input image data from the obtained input image data, pixelating the cropped portion of the input image data, and implementing one or more pixel mapping techniques on the pixelated portion of the input image data and at least a portion of the reference image data of the at least one corresponding hardware item.

6. The computer-implemented method of claim 1, wherein identifying one or more portions of the at least one hardware item comprises grouping sections of the at least a portion of the input image data into multiple clusters by processing the at least a portion of the input image data using at least one k-means clustering algorithm.

7. The computer-implemented method of claim 6, wherein identifying one or more portions of the at least one hardware item comprises processing at least a portion of the multiple clusters, in connection with reference image data of at least one corresponding hardware item, using at least one k-nearest neighbors algorithm.

8. The computer-implemented method of claim 1, wherein detecting at least one defect of the at least one hardware item comprises identifying at least one type of defect associated with the at least one detected defect by applying at least one probability distribution to the input image data corresponding to the one or more identified portions of the at least one hardware item.

9. The computer-implemented method of claim 1, wherein performing one or more automated actions comprises automatically training at least a portion of the at least one convolutional autoencoder model using feedback related to the at least one recommendation.

10. The computer-implemented method of claim 1, wherein performing one or more automated actions comprises automatically training at least a portion of the one or more computer vision techniques using feedback related to the at least one recommendation.

11. A non-transitory processor-readable storage medium having stored therein program code of one or more software programs, wherein the program code when executed by at least one processing device causes the at least one processing device:
  to obtain input image data pertaining to at least one hardware item;
  to identify one or more portions of the at least one hardware item by processing at least a portion of the input image data using at least one convolutional autoencoder model, wherein processing the at least a portion of the input image data using the at least one convolutional autoencoder model comprises:
    generating at least one compressed data representation of the at least a portion of the input image data; and
    identifying the one or more portions of the at least one hardware item by processing the at least one compressed data representation of the at least a portion of the input image data using one or more of at least one clustering algorithm and at least one supervised learning algorithm;
  to detect, in the one or more identified portions, at least one defect of the at least one hardware item by processing the at least a portion of the input image data using one or more computer vision techniques;
  to generate at least one recommendation associated with the at least one hardware item, the at least one recommendation pertaining to resolving the at least one detected defect using at least one system external to the at least one hardware item; and
  to perform, in connection with using the at least one system external to the at least one hardware item, one or more automated actions based at least in part on the at least one recommendation.

12. The non-transitory processor-readable storage medium of claim 11, wherein performing one or more automated actions comprises automatically initiating, via the at least one system external to the at least one hardware item, at least one of one or more hardware item repair operations, one or more hardware item refurbishment operations, one or more hardware item recycling operations, and one or more hardware item disposal operations.

13. An apparatus comprising:
  at least one processing device comprising a processor coupled to a memory;
  the at least one processing device being configured:
    to obtain input image data pertaining to at least one hardware item;
    to identify one or more portions of the at least one hardware item by processing at least a portion of the input image data using at least one convolutional autoencoder model, wherein processing the at least a portion of the input image data using the at least one convolutional autoencoder model comprises:
      generating at least one compressed data representation of the at least a portion of the input image data; and
      identifying the one or more portions of the at least one hardware item by processing the at least one compressed data representation of the at least a portion of the input image data using one or more of at least one clustering algorithm and at least one supervised learning algorithm;
    to detect, in the one or more identified portions, at least one defect of the at least one hardware item by processing the at least a portion of the input image data using one or more computer vision techniques;
    to generate at least one recommendation associated with the at least one hardware item, the at least one recommendation pertaining to resolving the at least one detected defect using at least one system external to the at least one hardware item; and
    to perform, in connection with using the at least one system external to the at least one hardware item, one or more automated actions based at least in part on the at least one recommendation.

14. The apparatus of claim 13, wherein performing one or more automated actions comprises automatically initiating, via the at least one system external to the at least one hardware item, at least one of one or more hardware item repair operations, one or more hardware item refurbishment operations, one or more hardware item recycling operations, and one or more hardware item disposal operations.

15. The apparatus of claim 13, wherein processing the at least a portion of the input image data using one or more computer vision techniques comprises processing the at least a portion of the input image data using at least one FastFlow model.

16. The apparatus of claim 13, wherein identifying one or more portions of the at least one hardware item comprises comparing the at least a portion of the input image data to reference image data of at least one corresponding hardware item.

17. The apparatus of claim 16, wherein comparing the at least a portion of the input image data to reference image data of a corresponding hardware item comprises cropping the at least a portion of the input image data from the obtained input image data, pixelating the cropped portion of the input image data, and implementing one or more pixel mapping techniques on the pixelated portion of the input image data and at least a portion of the reference image data of the at least one corresponding hardware item.

18. The apparatus of claim 13, wherein identifying one or more portions of the at least one hardware item comprises grouping sections of the at least a portion of the input image data into multiple clusters by processing the at least a portion of the input image data using at least one k-means clustering algorithm.

19. The apparatus of claim 18, wherein identifying one or more portions of the at least one hardware item comprises processing at least a portion of the multiple clusters, in connection with reference image data of at least one corresponding hardware item, using at least one k-nearest neighbors algorithm.

20. The apparatus of claim 13, wherein detecting at least one defect of the at least one hardware item comprises identifying at least one type of defect associated with the at least one detected defect by applying at least one probability distribution to the input image data corresponding to the one or more identified portions of the at least one hardware item.

* * * * *